Figure 1:
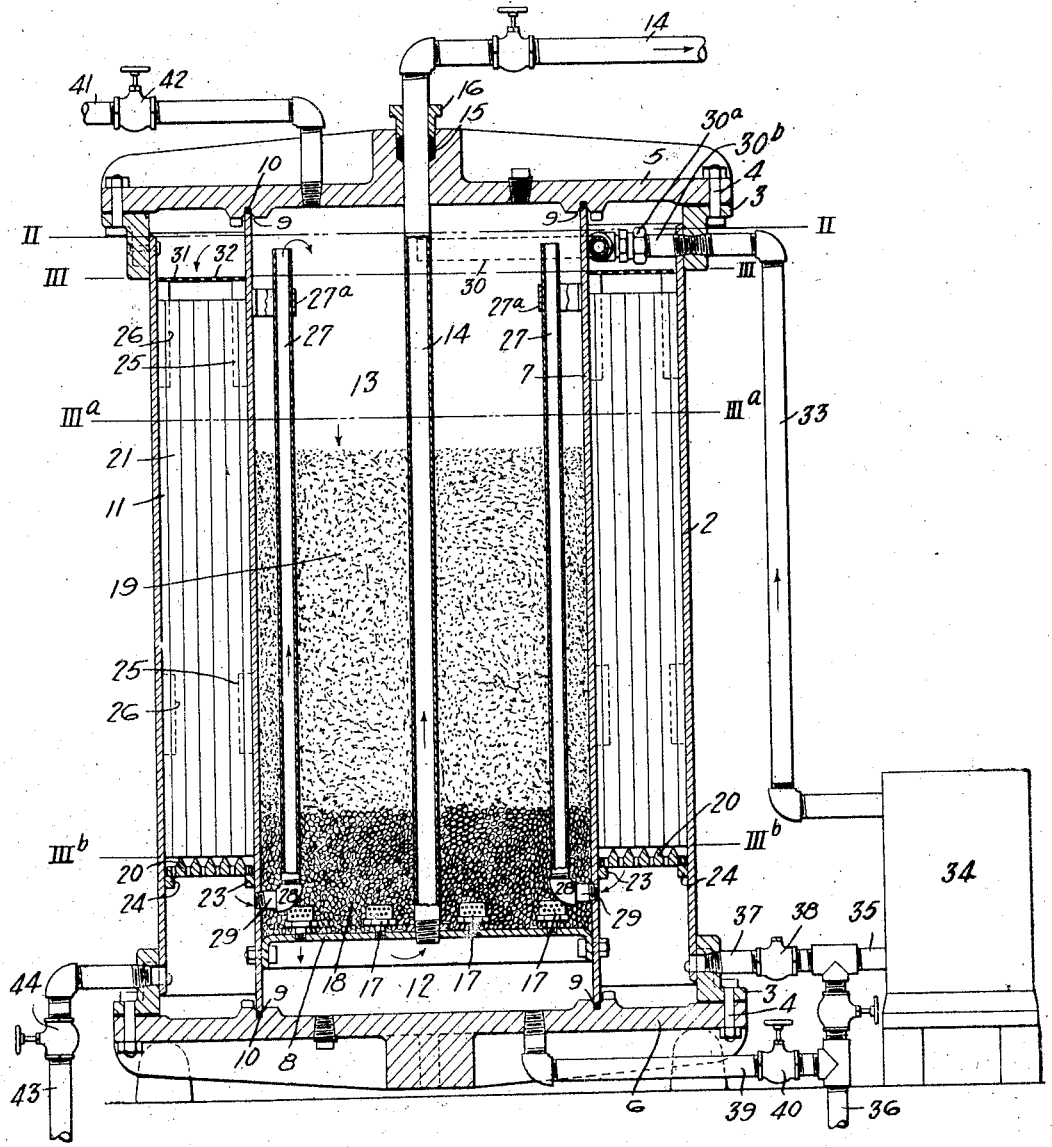

F. N. SPELLER.
APPARATUS FOR DEOXIDIZING AND FILTERING HEATED WATER.
APPLICATION FILED FEB. 17, 1916.

1,204,602.

Patented Nov. 14, 1916
3 SHEETS—SHEET 1.

F. N. SPELLER.
APPARATUS FOR DEOXIDIZING AND FILTERING HEATED WATER.
APPLICATION FILED FEB. 17, 1916.

1,204,602.

Patented Nov. 14, 1916.
3 SHEETS—SHEET 2.

WITNESSES.

INVENTOR

F. N. SPELLER.
APPARATUS FOR DEOXIDIZING AND FILTERING HEATED WATER.
APPLICATION FILED FEB. 17, 1916.
1,204,602.
Patented Nov. 14, 1916.
3 SHEETS—SHEET 3.
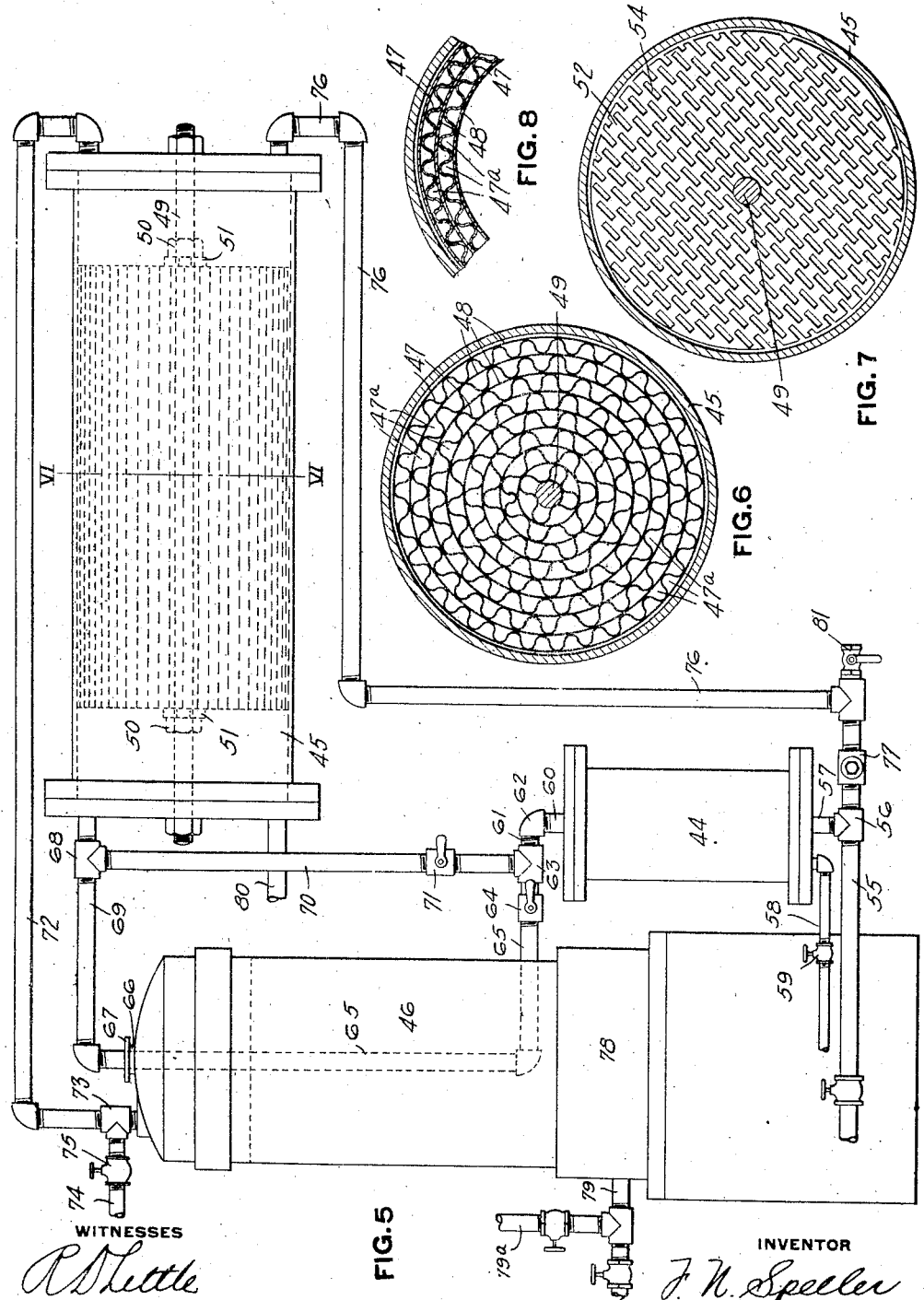

UNITED STATES PATENT OFFICE.

FRANK N. SPELLER, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

APPARATUS FOR DEOXIDIZING AND FILTERING HEATED WATER.

1,204,602. Specification of Letters Patent. Patented Nov. 14, 1916.

Application filed February 17, 1916. Serial No. 78,916.

*To all whom it may concern:*

Be it known that I, FRANK N. SPELLER, a citizen of the United States, and resident of Pittsburgh, in the county of Allegheny and State of Pennsylvania, have invented certain new and useful Improvements in Apparatus for Deoxidizing and Filtering Heated Water, of which the following is a specification.

My invention relates to apparatus for use in removing the free oxygen and other soluble corrosive matter in water, and in filtering heated water, and while applicable to other uses, more particularly relates to the construction and arrangement of apparatus for heating, and for deoxidizing and filtering the heated water supply of dwellings, hotels, public buildings, and similar localities, requiring a constant supply of hot water for distribution at any or all of a large number of outlets and in consequence in quantities varying frequently from zero to the maximum. It has been found that such hot water plants deteriorate quickly by reason of the rapid corrosion of the apparatus and piping leading from such apparatus on account of the large amount of free oxygen in the water.

One object of my invention is to provide apparatus for deoxidizing water, i. e., removing free oxygen and other soluble corrosive matter in the water, and for filtering the heated, deoxidized water, and having novel means whereby the water after being heated is caused to traverse and is brought into contact with a large surface area of wrought iron or steel and is thereby deoxidized and the deoxidized heated water is stored, and, as required for use, is filtered.

Another object of the invention is the provision of apparatus for heating, deoxidizing and filtering water having improved means whereby the heated water is brought into intimate contact with the large area of wrought metal surfaces necessary in deoxidizing the heated water and whereby liability of clogging of the passages in the deoxidizing chamber of the apparatus is avoided and overcome.

A further object of the invention is to provide apparatus having improved means whereby the deoxidized water is stored and is maintained in heated condition in contact with a large wrought metal surface of the same temperature as the water, thereby increasing the heat recuperating or storage capacity of the apparatus.

A still further object of my invention is the provision of apparatus having the novel construction and arrangement of parts shown in the drawings, specifically pointed out in the appended claims and more fully described hereinafter.

Figure 2:
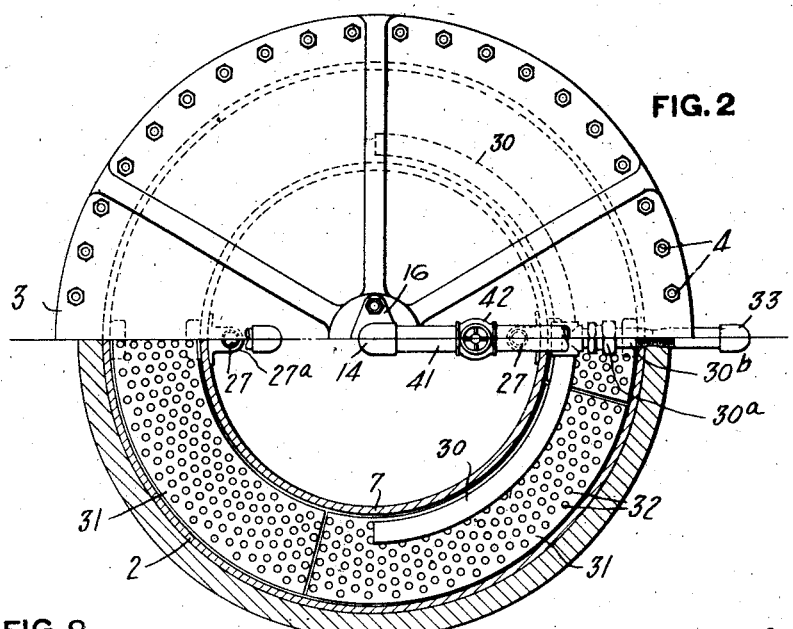
Figure 9:
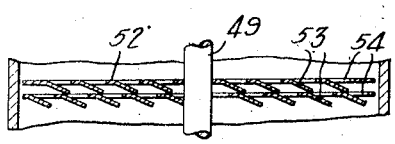
Figure 4:
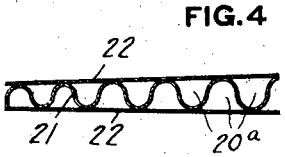
Figure 3:
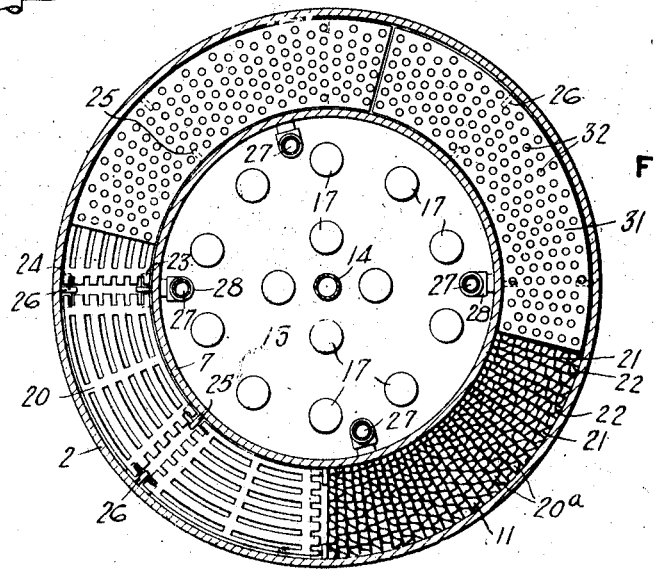

Referring now to the accompanying drawings, forming part of this specification, Figure 1 is a sectional elevation of a vertical deoxidizing and filtering apparatus constructed and arranged in accordance with my invention. Fig. 2 is a plan of the apparatus shown in Fig. 1, the lower half of this view being in section and the section being taken on the line II—II of Fig. 1. Fig. 3 is a sectional plan of the apparatus of Fig. 1, the upper half of the section being taken on the line III—III, the lower right hand half of the lower half on the line III$^a$—III$^a$, and the lower left hand half of the lower half of Fig. 3 being a section on the line III$^b$—III$^b$, of Fig. 1. Fig. 4 is a detail sectional plan, on a larger scale, showing the arrangement of the radially disposed corrugated and flat rolled steel or iron plates on the deoxidizing chamber of the apparatus of Fig. 1. Fig. 5 is a longitudinal side elevation showing a modified and preferred form of heating, deoxidizing and filtering apparatus constructed and arranged in accordance with my invention. Fig. 6 is a sectional end elevation of the deoxidizing chamber of the apparatus of Fig. 5, the section being taken on the line VI—VI of Fig. 5, showing one arrangement of the water deoxidizing plates within the deoxidizing chamber. Fig. 7 is a sectional end elevation similar to that of Fig. 6 showing a modification in the arrangement of the deoxidizing plates of the apparatus of Fig. 5. Fig. 8 is a sectional detail in end elevation showing on a larger scale the construction and arrangement of the deoxidizing plates of Figs. 5 and 6. Fig. 9 is a sectional detail, in side elevation, showing the arrangement of the cylindrical metal deoxidizing disks or plates of Fig. 7.

In the accompanying drawings, referring now to the vertical apparatus of Figs. 1 to 4, the numeral 2 designates the cylindrical shell of my improved apparatus which preferably is made of rolled metal plates having a flange 3 riveted or otherwise fastened to each end of the shell. Secured on the ends of the shell 2 through the medium of the flanges 3 and fastening bolts 4 so as to be removable are top and bottom heads 5 and 6. The contacting faces of the heads 5 and 6 and flanges 3 are machined so as to form a water tight joint, a gasket of suitable material being preferably used in making the joints tight. Secured within the wrought metal shell 2 is a cylindrical shell 7 of smaller diameter which also is formed of rolled steel or iron plates and riveted or otherwise fastened within the shell 7 at a point adjacent to its lower end is a flanged wrought metal head 8.

The open ends of the shell 7 are positioned within annular recesses or grooves 9 provided for that purpose in the heads 5 and 6, gaskets 10, 10, being positioned within these recesses to form a tight joint between the ends of the shell 7 and engaging surfaces of the recesses 9 when the heads 5 and 6 are fastened to the flanges in securing the parts in assembled position.

The shell 2, shell 7, flanged head 8, and the heads 5 and 6, when assembled, as has been described, form an annular outer deoxidizing chamber 11, a cylindrical bottom chamber 12, and a cylindrical inner filtering chamber 13. Extending vertically within the inner or filtering chamber 11 is a pipe 14, one end of this pipe being screwed into the threaded opening provided for that purpose in the flanged head 8, the pipe opening into the bottom chamber 12. The upper end of the pipe 14 which forms the outlet for the deoxidized water extends through the stuffing box 15 and gland 16 formed in the head 5 and connects on the exterior of the apparatus with the hot water lines leading to the hot water outlets at the places of use for the heated water. The flanged head 8 is provided with a plurality of screw threaded openings in each of which a strainer 17 is secured, the deoxidized water passing from the filtering chamber 13 through these strainers 17 into the bottom chamber 12.

The lower part of the inner or filtering chamber 13 contains a quantity of gravel 18 and on top of the gravel is a quantity of sand 19. As the head 5 is readily removed the sand and gravel used in the filtering chamber can be easily and quickly renewed when found necessary or desirable.

Within the annular deoxidizing chamber 11 near the lower end thereof is a series of slotted plates which are made in segments 20 of suitable size and which support the thin corrugated sheet metal plates 21 and flat plates 22 forming the deoxidizing surfaces within the deoxidizing chamber 11. The series of metal strips 23, which are welded or otherwise secured at intervals on the outer surface of the shell 7, and the series of similar metal strips 24 on the inner surface of the outer shell 2, provide projections which support the slotted plate segments 20 within the deoxidizing chamber 11. The slotted plates in turn support the deoxidizing plates 21 and 22 within the deoxidizing chamber. Also secured on the inner surface of the shell 2 and outer surface of the shell 7 near the top and bottom thereof, in the same way as the strips 23, 24, is a series of sets of short metal strips 25 and 26 which extend vertically lengthwise and engage the edges of the radially extending plates 22 to secure the oxidizing plates 21 and 22 in place in eight radially divided sections, in this way providing means permitting any one section or set of the eight sets or sections of deoxidizing plates to be removed without movement or disarrangement of the others. (See Fig. 3.)

The upper end of the filtering chamber 13 is connected to the lower end of the deoxidizing chamber 11 by means of the series of four equally spaced vertical pipes 27, elbows 28 and nipples 29 on the interior of the filtering chamber, the nipples 29 being screwed into threaded openings in the shell or wall 7 of the filtering chamber. A strap 27ª on the upper ends of the pipes 27 rigidly secures the pipes in vertical position.

As shown in Figs. 1 and 2, the deoxidizing sheets 20 are corrugated and extend radially within the chamber 13 with a flat thin sheet 21 of rolled steel or iron positioned between the adjacent faces of each pair of corrugated sheets. This arrangement of corrugated sheets provides a multiplicity of vertically extending openings 20ª for the passage of water through the deoxidizing chamber and provides the large exposed surface of iron necessary in removing the dissolved oxygen from the heated water while the water travels downwardly through the deoxidizing chamber and passes through the nipples 29 and pipes 27, into the upper end of the filtering chamber 13.

While flat sheets 21 of thin rolled steel or iron are shown between the radially extending corrugated sheets 20, obviously the flat sheets may be omitted and only the corrugated sheets 20 be used without change in the operation of the apparatus shown in Figs. 1, 2 and 3.

Positioned above the upper end of the corrugated sheets 20 and flat sheets 21 is a series of removable plates 31 which are made in sections, and are perforated to provide a series of holes 32 for the free passage of water from one side to the other of the plates. As shown the plates 31 rest upon and are supported by the strips 26, 27, fastened on the shell 2 and shell 7.

Opening into the outer or deoxidizing chamber 11 is a curved horizontal pipe 30 by which the heated water is supplied to the deoxidizing chamber. The pipe 30 is connected by a coupling 30ª to the nipple 30ᵇ screwed into the water inlet opening in the shell 7 and this opening is connected to one end of the water pipe 33. The other end of the supply pipe 33 is connected to the outlet of the water heater, a coil heater 34 being the type shown The water inlet to the heater 34 is connected by a pipe 35 to the cold water supply pipe 36 and the inlet pipe 35 is also connected to the lower end of the annular deoxidizing chamber 11 by a nipple 37, a check valve 38 being employed to control the direction of flow of the water and enable a circulation of water to be constantly maintained through the heater and downwardly through the deoxidizing chamber again into the heater, and prevent cold water flowing into the deoxidizing chamber.

As the volume of metal plates is considerable, these plates act to store up heat when the circulation is maintained and to transfer the heat to colder water entering the deoxidizing chamber, in this way adding to the efficiency of the apparatus.

The cold water supply pipe 36 is also connected by a branch pipe 39 with the bottom of the chamber 12 to provide means for washing out the apparatus, a valve 40 being provided to close the branch pipe 39 when not in use. A discharge pipe 41 is also connected to the upper end of the filtering chamber for use in washing out the filtering chamber 13, a valve 42 being provided to close the pipe when not in use, and a similar washout pipe 43 having a valve 44 is provided on the lower end of the deoxidizing chamber 11.

In the preferred construction shown in Figs. 5, 6, 7, 8 and 9, the apparatus comprises a coil heater 44, a cylindrical, lengthwise horizontal deoxidizing chamber 45, and a filtering and storage vessel 46. Secured within the deoxidizing chamber 45 is a series of rows of corrugated plates 47 which are held in spaced position by means of a series of flat plates 48 bent into cylindrical form, the construction and relative arrangement of these plates being clearly shown in Fig. 8. The corrugations provide a multiplicity of openings 47ª through which the water passes and in passing therethrough the large surface of metal exposed acts to deoxidize the heated water and to remove any other soluble corrosive matter in the heated water.

The plates 47 and 48 are of a length somewhat less than the overall length of the deoxidizing chamber, so as to provide an open space at each end of the chamber, being held in position on the axially extending screw threaded rod 49 by the nuts 50, 50, the rod 49, which extends through the deoxidizing chamber on the axis thereof, being fastened in place by the nuts 51.

Instead of arranging the deoxidizing plates in the manner shown in Figs. 5 and 6, and in detail in Fig. 8, a series of punched or slotted cylindrical disks 52 may be employed which are threaded on the rod 49 in the manner shown in Figs. 7 and 9. In this construction tongues 53 are formed in punching the series of openings 54 in the disks so as to not lessen the amount of the metal plate surface which comes into contact with the water. The tongues 53, which are struck up in punching the holes 54 in the disks or plates, also serve as separators by which the plates 52 are spaced or held at a distance apart, this construction and arrangement being clearly illustrated in Fig. 9.

The area of the plate surface exposed to contact with the water depends upon and increases with the volume of heated water required and the temperature to which the water is heated. Ordinarily, a thermostat will be employed to regulate the temperature to which the water is heated.

In the apparatus of Figs. 5 to 9, the cold water supply pipe 55 is connected into one end of a T 56 and the branch outlet of this T is connected by a nipple 57 to the cold water inlet on the lower end of the heater 44. A steam pipe 58 having a valve 59 thereon also is connected into the lower end of the heater and the outlet on the upper end of the heater is connected by nipples 60, 61, and an elbow 62 to one end of a T 63. A valve 64 is provided on the discharge end of the T 63 and the piping 65 extends into the filtering chamber 46 at the side thereof near the lower end of the filter chamber and then extends upwardly within the chamber 46 and through the stuffing box 66 and gland 67 on the upper end of the filtering chamber and connects into a T 68 on the water line 69 leading to the hot water inlet on one end of the deoxidizing chamber 45.

The branches on the T's 63 and 68 are connected by a pipe 70 and a valve 71 to form a by-pass by which heated water, when found necessary or desirable, may be delivered directly from the heater 44 into the deoxidizing chamber 45 without passing through the pipe extending into and through the filtering chamber 46.

On the discharge end of the deoxidizing chamber is an outlet which is connected by suitable piping 72 with the T 73 on the piping leading to the inlet on the filter 46 for the heated and deoxidized water. The T 73 on this inlet pipe has its branch outlet connected to a line 74 with a valve 75 on the branch line 74 so as to provide a water outlet in reversing the direction of flow of water through the filter for use in washing the body of sand and gravel maintained within the filter. The branch on the T 79ª affords means for supplying water to the bottom of the filter in washing the filter.

A pipe line 76 is provided to connect the discharge end of the deoxidizing chamber 45 with the T 56 leading into the water inlet to the water heater 44 and a check valve 77 is inserted in this line so as to form a return line to cause the circulation of water through the heater, the pipe 65 in the filter and the deoxidizing chamber when heated water is not being withdrawn from the filter. The valve 81 on the return line 76 adjacent to the T 56 provides means for washing out the heater and deoxidizing chamber.

The filter 46 is provided with a storage chamber 78 in its lower end and the outlet pipe 79 thereon leads to the service lines or hot water outlets which are located at remote points. (Not shown).

A cold water inlet 80 may be provided on the lower portion of the inlet end of the deoxidizing chamber 45 instead of or in addition to the cold water inlet 55, the arrangement of piping otherwise remaining the same. When the water is supplied by the inlet 80 it traverses the deoxidizing chamber and passes into the heater through the circulating pipe 76 and after passing through the heater 44 again passes into and through the deoxidizing chamber in the manner which has been described.

The heater shown in Fig. 5 may bring the steam into direct contact with the water in heating the water, a steam coil may be employed when desired, or the heater may be heated by gas or in any other known manner. The filter of Fig. 5 is provided with a series of strainers arranged in the manner shown in the filter of Fig. 1 to permit the filtered water to pass out of the filter chamber into the bottom chamber at the lower end of the filter.

The operation of my improved apparatus will be readily understood. With the apparatus of Figs. 1 to 5, the water as heated rises in the inlet pipe 33 from the heater 34 and is discharged through the ends of the curved pipe 30 into the upper end of the deoxidizing chamber 11 above the perforated plates 31. The heated water passes downwardly through the perforations and into and through the multiplicity of vertical passages 20ª, formed by the corrugated plates 21 and 22, and into the annular open space at the bottom of the deoxidizing chamber 11, becoming deoxidized by contact with the surfaces of the corrugated plates. The water then passes from the deoxidizing chamber into the vertical pipes 27 and is discharged therefrom into the upper end of the filtering chamber 13. The deoxidized water descends through the sand and gravel in this chamber and is filtered thereby and passes out of the filtering chamber 13 through the strainers 17 into the bottom chamber 12 from which the deoxidized and filtered water rises through the central discharge pipe 14 connected to the hot water line leading to the hot water outlets or places of use.

In passing through the deoxidizing chamber 11 the heated water is brought into contact with the exposed surfaces of the large number of corrugated steel or wrought metal plates 21, 22, within the deoxidizing chamber, and as these plates are rigidly secured in assembled relation there is no relative displacement of the iron surfaces by reason of water currents in the water flowing through the water deoxidizing chamber. Contact by the water with the surfaces of the corrugated plates in passing through the deoxidizing chamber will remove the oxygen and other soluble corrosive matter in the heated water, and any solids in suspension in the deoxidized water are removed in passing through the filtering chamber, while the arrangement of piping shown and described will cause the heated water to travel or constantly circulate through the heater, and the deoxidizing chamber during the time intervals when heated water is not being withdrawn from the apparatus through the discharge pipe 14.

In the operation of the apparatus of Figs. 5 to 9, which is preferable on account of its simplicity and relatively lower cost, the cold water enters the heater through the inlet pipe 55, the T 56, and nipple 57. The heated water passes from the heater through the outlet 60 and pipes 65, 69, into the deoxidizing chamber 45, traversing the multiplicity of openings formed by the corrugated plates 47, in passing through the deoxidizing chamber the free oxygen and other soluble corrosive matter in the water thereby being removed. The deoxidized water is led from the deoxidizing chamber 45 through the pipe 72 into the filtering chamber and passing downwardly therethrough passes out of the filter through the discharge pipe 79.

There will be time intervals when water is not being withdrawn from the filter, and at such times it is desirable to maintain a constant circulation of water through the apparatus. In such cases the water will pass from the discharge end of the deoxidizing chamber 45 through the pipe 76, into the heater 44 and again pass from the heater into the deoxidizing chamber as has been described. The heated water in passing through the pipe 65 within the filtering chamber will heat the filter so that filtered water of the desired high temperature is in readiness to be withdrawn at any time. When desired the circulation pipes 65 may be cut out and the water is then caused to circulate from the heater through the bypass formed by the pipe 70 and valve 71 into the deoxidizing chamber 45.

The advantages of my invention, which will be readily appreciated by those skilled in the art, arise from the improved arrangement of deoxidizing surfaces within the deoxidizing chamber and from the novel combination of heater, deoxidizing and filtering chambers, and the connecting piping. The combination shown and described provides ample deoxidizing surfaces, and enables the heated water to be deoxidized and all soluble corrosive matter to be removed, the heated water to be stored, and the filtered water to be maintained in heated condition in readiness for use when desired. The maintenance of the supply of hot deoxidized water in readiness for use lessens the cost of heating the water by providing an equipment which heats the deoxidized filtered water throughout periods of time when water is not being withdrawn from the apparatus. The deoxidizing apparatus lengthens the life of the piping and connections and the construction of the deoxidizing apparatus avoids liability of clogging and the resultant frequent repairs.

The large body of metal plates within the deoxidizing chamber adds materially to the recuperative or heat storage capacity of the system, as the plates become heated to the same temperature as the water when the water is circulated through the apparatus, and as this heat is given up to the incoming water should the temperature of the water fall below the established maximum the water is maintained at a more equable temperature in cases where the demand for heated water is quite variable.

Modifications in the construction and arrangement of the parts forming my improved apparatus may be made without departing from my invention as defined in the appended claims.

I claim:

1. Apparatus for deoxidizing and filtering heated water comprising a heater having an inlet, a filtering chamber having an outlet, a deoxidizing chamber, piping connecting the deoxidizing chamber with the heater and the filtering chamber, and a plurality of thin rolled steel or iron plates within the deoxidizing chamber.

2. Apparatus for deoxidizing and filtering heated water comprising a heater having a water inlet, a filtering chamber having an outlet, a deoxidizing chamber, piping connecting the deoxidizing chamber with the heater and the filtering chamber, and a plurality of thin corrugated rolled steel or iron plates relatively arranged to form a multiplicity of passages within the deoxidizing chamber and to present a large area of metal surface to contact with water passed through said deoxidizing chamber.

3. Apparatus for deoxidizing and filtering heated water comprising a heater having an inlet, a filtering chamber having an outlet, a deoxidizing chamber, piping connecting the deoxidizing chamber with the heater and the filtering chamber, piping connecting the deoxidizing chamber and heater to thereby maintain a circulation of water through the filtering chamber, deoxidizing chamber and heater, and a plurality of thin rolled steel or iron plates within the deoxidizing chamber.

4. Apparatus for deoxidizing and filtering heated water comprising a heater, a deoxidizing chamber, and a filtering chamber, inlet and outlet openings therein, means connecting the outlet of said heater to the deoxidizing chamber inlet, means connecting the outlet of said deoxidizing chamber with the inlet to said filter, and means connecting the deoxidizing chamber and heater whereby a circulation of water is maintained through the filtering chamber, deoxidizing chamber, and heater.

5. Apparatus for deoxidizing and filtering heated water comprising a heater having a water inlet, a cylindrical filtering chamber, an annular deoxidizing chamber surrounding said filtering chamber, a plurality of radially extending corrugated rolled steel or iron plates within the deoxidizing chamber forming a multiplicity of passages and presenting a large area of metal surface to contact with water passed through the deoxidizing chamber, means connecting the heater outlet with the top of said deoxidizing chamber, means connecting the bottom of said deoxidizing chamber with the top of said filter chamber and a water outlet connected to the lower end of said filtering chamber.

6. Apparatus for deoxidizing and filtering heated water, comprising a heater having an inlet, a filtering chamber having an outlet, a deoxidizing chamber, and means connecting the deoxidizing chamber with the heater and the filtering chamber whereby the water is caused to pass from the heater through the deoxidizing chamber into the filtering chamber.

7. Apparatus for deoxidizing and filtering heated water, comprising a heater having an inlet, a filtering chamber having an outlet, a deoxidizing chamber, means connecting the deoxidizing chamber with the heater and the filtering chamber whereby the water is caused to pass from the heater through the deoxidizing chamber into the filtering chamber, and means connecting the heater, deoxidizing chamber and filtering chamber to maintain a circulation of water through said heater, deoxidizing chamber and filtering chamber.

In testimony whereof I have hereunto set my hand.

FRANK N. SPELLER.

Witnesses:
    CHRIS SPRING,
    WM. RIEBEL.